Jan. 20, 1931.  C. RIEGGER  1,789,476
FAUCET
Filed Oct. 10, 1929
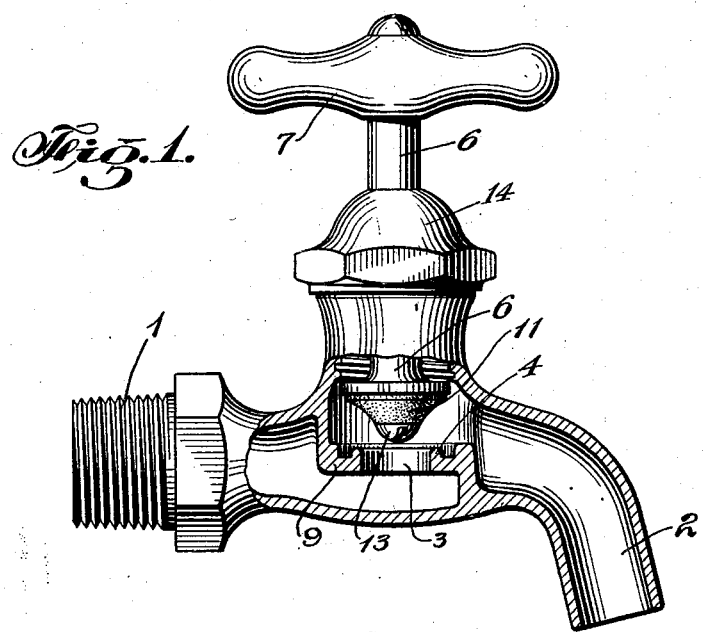
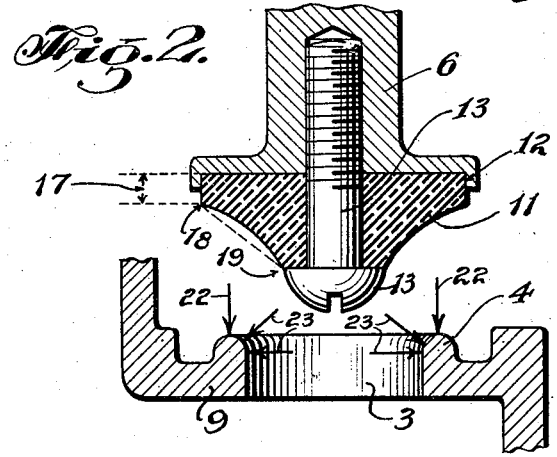
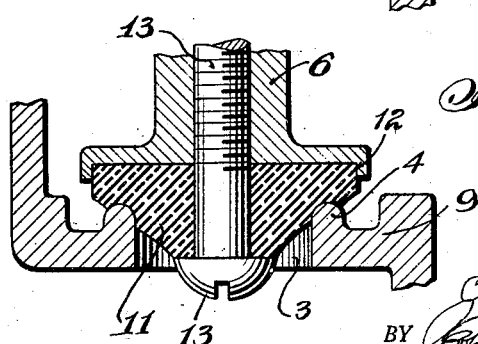
INVENTOR.
Constantin Riegger
BY
ATTORNEYS.

Patented Jan. 20, 1931

1,789,476

UNITED STATES PATENT OFFICE

CONSTANTIN RIEGGER, OF NEW YORK, N. Y., ASSIGNOR TO GOOD MANUFACTURING COMPANY, INC., OF NEW YORK, N. Y., A CORPORATION OF NEW YORK

FAUCET

Application filed October 10, 1929. Serial No. 398,591.

The objects of my invention are to provide an improved gasket, packing or washer for the gates of common household water faucets of the screw or compression type and the like, and also to provide an improved valve particularly suited for use as a household water faucet of the screw or compression type, to the end that the valve may not be so quick to leak as the result of pitting, wear and imperfections as the ordinary household faucet now in common use, and to the end that there may not be so much tendency for the valve to produce hammering and other noises in the water pipes. While I believe that the invention will find its greatest utility in connection with household water faucets, and hereinafter describe it only as applied to a common form of such faucet, it will be understood from this description that the invention may be applied to various other fluid-shut-off valves also.

The seat for the gate of the compression or screw type household water faucet now in common use, is usually a raised or projecting metal annulus at and forming one end of an otherwise cylindrical port; this annulus is frequently or usually about semi-circular in cross section. The gasket, packing or washer of the gate (in some form it is called a cushion), is usually made of fibre or rubber composition. For brevity, I shall hereafter refer to these gaskets, packings, washers and "cushions", as "washers." Usually the washer is either a flat disc, or a truncated cone with a cylindrical portion or parallel sides for a short distance adjacent the larger face. When a flat disc, the washer seats flat against the end of the port, e. g. against the top or apex of the metal annulus. When the washer is a truncated cone in form, it is so placed on the valve stem that its smaller end projects into the port when the gate is seated, and hence the washer seats more against the side wall of the port than does the flat disc type, i. e. engages the port walls at a point somewhat away from the extreme end of the port, as where the wall flares outwardly at the annulus. The degree of softness and resiliency of the ordinary washer varies somewhat among the different makes on the market. Whatever the make however, and whatever its shape, the area of contact between the common washer and the valve seat is a very narrow one. As the average user normally closes a screw or compression faucet, there is frequently little more than a broad line of contact between the washer and its seat to resist flow of water; or, to state the matter in still another way, the length of the contact between the valve gate and its seat, as measured in a direction of the water flow, is very short. As a consequence, relatively slight imperfections, pitting or wear are sufficient to permit water to pass around the contact area of such faucets. Hence such faucets leak rather readily. In the Fuller ball type of valve, the gasket or packing is drawn farther into the port and somewhat along the side walls of the port; the effect is something like that of a plug valve whereby the dimension of the area of contact, parallel to the fluid flow, is lengthened.

For reasons which will appear as this description proceeds, the packing or washer of my invention is more properly described as a "cushion" than the so-called "cushions" heretofore employed. I give the cushion of my invention something of the truncated-cone shape heretofore employed. Instead of giving the cushion a truly truncated-cone shape however, that is to say, a straight-sided form where it is to engage the valve seat, I make the side wall or walls at this part of my cushion slightly re-entrant, preferably curved (inwardly) or concaved. I have found that by proportioning and correlating the degree of re-entrance of the sides of a cushion of such shape, its softness, and its resiliency or elasticity, and employing an adequate mass or quantity of the soft resilient material at this side wall or walls, a distinctly new type of contact can be obtained; namely, one combining the characteristics of the face contact which the common flat disc type of washer makes against the end of the port, with something of the characteristics of the plug type of valve wherein the gate presses substantially radially outwardly against the interior walls of the port. I thereby lengthen the area of flow-preventing contact between the gate and seat to such an extent that the valve, as ordinarily manipulated by the average user of household faucets, closes watertight even when the seat end of the port is broken, cut or pitted through, from side to side, for an easily measurable and readily apparent depth. Ordinarily at least, I contemplate that the end of the port will be flared outwardly, usually along a smooth curve leading off tangentially from the straight-sided or cylindrical part of the port as and preferably by the use of the semi-circularly-sectioned annulus frequently found in household screw faucets as before noted. Preferably too, I make the whole or substantially the whole of the body of the cushion of soft resilient material, thereby providing a quite adequate mass or volume of such material for my purposes.

By suitable correlation of the factors noted, the area of the flow-preventing engagement of the gate with its seat can be extended even into the straight-sided or cylindrical portion of the port. By way of illustrating the efficacy of my invention, I may mention that I have, for test purposes, cut or kerfed the annular seat or projection of an ordinary household water faucet completely through, from side to side, to a depth of $\frac{1}{16}$th of an inch, and I have found that the cushions of my invention are adequate to close watertight the faucet so mutilated.

To reduce the tendency of the valve to produce hammering and other noises, I preferably make the smaller end of the cushion as small as may be, and preferably extend the concavity of the washer side to this smallest diameter; where the cushion is held to the valve stem by a screw (as in the common household faucet) I preferably make the smaller end of the cushion of the same diameter as the head of the screw. Thereby I provide a smoothly curving path for the water flowing from the valve port when the gate is raised, and reduce the tendency of the water to throw the washer or cushion violently out from the port and vibrate it, as a loosely set washer screw or a worn or badly formed screw thread may permit otherwise. The rounded head usually found on the washer screw of faucets cooperates to the same end with a cushion so formed, forming therewith a compound curve for the waterway, as will be apparent.

The accompanying drawings illustrate a preferred embodiment of my invention. Fig. 1 is a vertical section through a common form of household water faucet with one of my cushions substituted for the more usual form of washer, the cushion being shown in elevation. Fig. 2 is a detail of Fig. 1, to a larger scale, the cushion and adjacent part of the valve stem being shown in section. Fig. 3 is similar to Fig. 2, but shows the gate seated.

The familiar screw or compression type of household water faucet illustrated will be recognized from the drawings and needs little description. The water enters at the threaded end 1 and flows from the bibb 2 when the valve gate is raised. The valve port heretofore mentioned, circular in section and for the most part cylindrical as usual, is shown at 3; the semi-circularly-sectioned projecting annulus at and forming the gate end of the port is indicated by 4, its inner curve or surface blending tangentially into the straight-sided and cylindrical portion of the port 3. The valve stem 6 is threaded to the faucet body in such a manner that by turning the handle 7 in one direction, the gasket, packing, washer, or "cushion" on the lower end of the stem can be pressed against the partition 9 about the port to close the faucet, and by reverse turning can be raised again from the port to permit water to flow. As is frequently the practice, a circular flat-bottomed recess 12 is provided in the lower end of the stem to receive and confine the washer or "cushion" 11, the latter being held therein by the screw 13. The cap 14, surrounding the stem 6 and confining the stem to the valve body, is threaded to the body externally, as is also common practice.

The recess 12 being designed to receive the common flat disc washer, no change need be made in the metal portions of such a faucet as that illustrated when applying my invention thereto: the diameter of the larger end of the circular cushion 11 involved in my invention, that is to say, the face which engages the end of the stem 6, may be equal to the diameter of the flat disc washer or the truncated cone which it displaces, so that the new cushion 11 fits in the same recess. Preferably I make the diameter of the opposite and smaller end of the cushion of the same diameter as the head of the washer-screw 13 as before noted. The length or thickness of my cushion 11, i. e. the dimension of my cushion from the smaller face to the larger, may be about equal to the corresponding dimension of the prior truncated-conical washer for which it may be substituted, but usually I make it a little greater so as to somewhat enlarge the mass or volume of the material in my cushion and to extend the area of the seating of my cushion on the partition 9 somewhat farther down into the port 3. Also to somewhat increase the mass or volume of the material still farther, and to improve the seating at the top by carrying this seating somewhat farther over, or externally of, the apex of the annulus 4, I usually somewhat increase the length of the straight-sided or cylindrical portion at the larger end of the cushion (i. e. the dimension 17, Fig. 2) up to about twice the depth of the recess 12 as illustrated, departing in this respect also from common practice with truncated-cone washers. Between the two diameters, that is to say, in that portion of the cushion which is to engage with the partition 9, at the port 3 to close the faucet, the side wall or walls of the cushion are concaved as appears best in Fig. 2. This concaving need be but slight; for example, according to my customary practice the maximum distance to which the concaved surface departs from an imaginary straight line drawn from point 18 to point 19 on the washer (i. e. the broken line shown on Fig. 2) is of the order of from 1/64th of an inch to $\frac{1}{32}$nd of an inch. In accordance with the preference heretofore expressed, the whole body of this cushion 11 is composed of the rather soft resilient material; this assures an adequate mass or volume of the material. The degree of softness and the degree of resiliency of this material is such that, in correlation with the depth of the curvature or concavity in the cushion side or sides and the mass or volume of material at hand, the cushion not only makes flow-preventing engagement with the extreme end of the valve port (i. e. by pressing downwardly on the apex of the annulus 4 in the direction of the arrows 22 in Fig. 2, more or less after the fashion of the common flat disc wisher), but also the cushion makes flow-preventing engagement against the partition 9 from thence to a point within the cylindrical portion of the port 3, the cushion throughout this distance pressing radially outwardly against the port wall at each point in the general directions indicated by the arrows 23 of Fig. 2. As a result of this co-ordination of these factors also, the cushion may seat in effective engagement with the partition 9 for some little distance externally of the apex of the annulus 4. A typical seating of the cushion, according to my invention, is shown in Fig. 3. Usually I employ a rubber compound for the material of the cushion, that is to say, a mixture of rubber and foreign matter, providing at the same time for that degree of toughness which is necessary in faucet washers; mixtures of rubber and foreign matters having suitable characteristics of softness and resiliency, together with toughness, will be readily devised by those skilled in the art; I anticipate that various mixtures and various materials will be developed.

As is apparent from Fig. 2, the concavity in the cushion side from the head of the screw 13 to the point 18, all around the cushion, provides a maximum of smoothly curving path, at the side of the cushion, for the water flowing from the port 3 when the gate is raised. At the same time, the rounded head of the screw 13, blending into this concavity and continuing the curve farther into the port, aids, I believe in reducing the tendency of the faucet to produce hammering in the pipes and other noises.

It will be understood, of course, that my invention is not limited to the various details of the accompanying drawings and the foregoing descriptive matter, except as appears hereinafter in the claims.

I claim:

1. The combination with a household water faucet having a rigid projecting substantially-semi-circularly-sectioned annulus forming the gate-end of a cylindrical port, and a stem, of a circular cushion washer consisting of a resilient material sufficiently soft to yield under the compression normally given the gates of such faucets in closing them, the cushion having, at its end which engages with said stem, a diameter greater than the diameter of the gate end of said port, at its opposite end a diameter less than the diameter of the port, and a concave-curved side wall joining the said two diameters, the depth of said curvature, the softness of said material, and its resiliency, being so correlated that the cushion, when pressed to its seat by the faucet stem, not only makes flow-preventing face-contact engagement with said annulus, but also makes flow-preventing engagement with the cylindrical portion of the interior wall of the port, pressing radially outwardly against said interior wall, the end of the faucet stem having a circular recess in which the cushion is seated, and the side wall of the cushion, at the stem end thereof, being substantially parallel to the axis of the cushion and stem.

2. The combination with a household water faucet having a rigid projecting substantially-semi-circularly-sectioned annulus forming the gate-end of a cylindrical port, a screw-thread-operated stem, and a substantially-round-headed screw to hold the cushion washer to the end of said stem, of a circular cushion washer consisting of a resilient material sufficiently soft to yield under the compression normally given the gates of such faucets in closing them, the cushion having, at its end which engages with said stem, a diameter greater than the diameter of the gate end of said port, at its opposite end a diameter not less than the diameter of the head of said washer screw, and a concave-curved side wall joining the said two diameters, the depth of said curvature, the softness of said material, and its resiliency being so correlated that the cushion, when pressed to its seat by the faucet stem, not only makes flow-preventing face-contact engagement with said annulus, but also makes flow-preventing engagement with the cylindrical portion of the interior wall of the port, pressing radially outwardly against said interior wall.

3. A cushion washer for household compression-type water faucets, consisting of a circular body composed of a resilient material sufficiently soft to yield under the compression normally given the gates of such faucets in closing them, said body having at one end a substantially flat face to engage the end of the stem, at its opposite end a diameter less than the diameter of the port with which the cushion washer is to be used, a cylindrical portion adjacent said flat face, the diameter of which portion is at least equal to substantially the diameter of the end of said port, and a portion having a concave-curved side wall extending from said cylindrical portion to substantially said smaller end of the body, the body being perforated axially to receive a screw to fasten the body to the faucet stem, and the depth of said curvature, the softness of said material, and its resiliency being so correlated that the cushion can make not only flow-preventing substantially-face-contact engagement with the ordinary substantially-semi-circularly-sectioned annular projection commonly providing the gate end of faucet ports, but also flow-preventing engagement with the interior wall of the port from substantially the gate end of the port to a point a material distance away from said end of the port, pressing radially outwardly against said interior wall.

4. The subject matter of claim 3, characterized by the fact that the diameter of the said cylindrical portion of the circular body is greater than the diameter of said gate end of the faucet port.

In testimony whereof, I have signed this specification.

CONSTANTIN RIEGGER.